(12) United States Patent
Hyde et al.

(10) Patent No.: US 6,544,643 B1
(45) Date of Patent: Apr. 8, 2003

(54) PRESSURE SENSITIVE ADHESIVE COMPRISING POLY(1-ALKENE) ELASTOMER AND MULTIFUNCTIONAL (METH)ACRYLATE, ARTICLES PREPARED THEREFROM AND A METHOD OF MAKING

(75) Inventors: Patrick D. Hyde, Burnsville, MN (US); Michele A. Craton, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/670,068

(22) Filed: Sep. 26, 2000

(51) Int. Cl.$^7$ ............................................. B32B 27/32
(52) U.S. Cl. .................. 428/355 EN; 428/355 AC; 428/402; 427/208.4; 427/384; 525/71; 525/80; 525/98; 525/243; 525/903
(58) Field of Search .................. 428/355 EN, 355 AC, 428/402; 525/183, 186, 71, 80, 243, 98, 903; 427/208.4, 384

(56) References Cited

U.S. PATENT DOCUMENTS

| | | |
|---|---|---|
| 3,635,755 A | 1/1972 | Balinth et al. |
| 3,954,697 A | 5/1976 | McConnell et al. |
| 4,133,731 A | 1/1979 | Hansen et al. |
| 4,151,057 A | 4/1979 | St. Clair et al. |
| 4,178,727 A | 12/1979 | Prusinski et al. |
| 4,288,358 A | 9/1981 | Trotter et al. |
| 4,379,201 A | 4/1983 | Heilmann et al. |
| 4,432,848 A | 2/1984 | Korpman |
| 5,059,088 A | 10/1991 | Klein |
| 5,112,882 A | 5/1992 | Babu et al. |
| 5,194,501 A | 3/1993 | Babu et al. |
| 5,202,361 A | 4/1993 | Zimmerman et al. |
| 5,209,971 A | 5/1993 | Babu et al. |
| 5,227,442 A | 7/1993 | Babu et al. |
| 5,232,958 A | 8/1993 | Mallya et al. |
| 5,244,962 A | 9/1993 | Plamthottam et al. |
| 5,294,668 A | 3/1994 | Babu |
| 5,644,007 A | 7/1997 | Davidson et al. |
| 5,824,748 A | * 10/1998 | Kesti et al. .................. 525/243 |
| 5,859,088 A | 1/1999 | Peterson et al. |
| 5,876,855 A | 3/1999 | Wong et al. |
| 6,045,895 A | 4/2000 | Hyde et al. |
| 6,063,838 A | 5/2000 | Patnode et al. |
| 6,103,152 A | 8/2000 | Gehlsen et al. |

FOREIGN PATENT DOCUMENTS

| | | |
|---|---|---|
| AU | 73730/91 | 10/1991 |
| EP | 0 620 257 A2 | 4/1994 |
| EP | 0 632 077 A2 | 6/1994 |
| EP | 0 960 924 A1 | 12/1999 |
| JP | 9235307 | 9/1997 |
| WO | WO 92/19691 | 11/1992 |
| WO | WO 93/07228 | 4/1993 |

OTHER PUBLICATIONS

Datta et al., Polymeric Compatibilizers, 1996, Hanser Publishers, p. 13.*
Paul et al., Polymer Blends, 2000, John Wiley & Sons, Inc., vol. 1: Formulation, pp., 265, 502.*
P.S. Majumder and A.K. Bhowmick, Influence of the Concentration of Trimethylol Propane Triacrylate on the Electron Beam–Induced Surface Modification of Epdm Rubber, *J. Adhesion Sci. Technol.*, vol. 11, No. 10, pp. 1321–1342 (1997).

* cited by examiner

Primary Examiner—Robert Dawson
Assistant Examiner—Christopher M. Keehan

(57) ABSTRACT

The invention relates to a pressure sensitive adhesive composition comprising a poly(1-alkene) elastomer and a multifunctional (meth)acrylate component. The invention also relates to articles comprising the composition and a method of making the composition.

26 Claims, No Drawings

PRESSURE SENSITIVE ADHESIVE COMPRISING POLY(1-ALKENE) ELASTOMER AND MULTIFUNCTIONAL (METH)ACRYLATE, ARTICLES PREPARED THEREFROM AND A METHOD OF MAKING

FIELD OF THE INVENTION

The invention relates to a pressure sensitive adhesive composition comprising a poly(1-alkene) elastomer and a multifunctional (meth)acrylate component. The invention also relates to articles comprising the composition and a method of making the composition.

BACKGROUND OF THE INVENTION

Poly(1-alkenes) are alpha-olefin polymers also referred to as poly-(α-olefins). Poly(1-alkenes) are known in the art to be useful in a variety of compositions, such as pressure sensitive adhesives. However, each particular such pressure sensitive adhesive typically does not have the properties necessary to meet requirements of each and every of the many different specific applications that exist for pressure sensitive adhesives. There is an ongoing need for pressure sensitive adhesives having specific properties tailored to meet the requirements of the particular end use. For example, it would be desirable to provide a poly(1-alkene) elastomer-based pressure sensitive adhesive that can bond well to polar substrates. Furthermore, it would be desirable for such adhesives to possess adequate cohesive strength such that can be cleanly removed from such an adherend without separating from the backing (when used in the form of a tape).

SUMMARY OF THE INVENTION

The pressure sensitive adhesive composition of the invention is tailorable to provide a unique balance of adhesive properties in an attempt to address the need for a pressure sensitive adhesive that adheres to a broad range of substrates while having high adhesion to a tape backing, i.e., the tape adheres to a surface, but on removal, the adhesive pulls cleanly away from the surface and remains adhered to the backing.

In one embodiment, the pressure sensitive adhesive composition of the present invention comprises: a first domain comprising a poly(1-alkene) elastomer; and a second domain comprising a multifunctional component selected from multifunctional (meth)acrylate monomers, multifunctional (meth)acrylate oligomers, and combinations thereof; wherein the second domain comprises at least about 30 weight percent of the multifunctional component based on the total weight of the second domain. In another embodiment, the pressure sensitive adhesive composition comprises: greater than 50 weight percent of at least one poly(1-alkene) elastomer and at least one multifunctional (meth)acrylate component.

The pressure sensitive adhesive composition is capable of adhering to a broad range of substrates, e.g., polar materials, such as glass, metals and polar polymers; and nonpolar materials, such as polyolefins, and can be tailored to provide varying cohesive strengths suitable for the intended end use. The pressure sensitive adhesive composition can, optionally, be crosslinked to provide improved cohesive strength properties so that the tape can be removed cleanly from a substrate without the adhesive separating from the backing or the adhesive failing cohesively and leaving adhesive residue on the surface.

This balance of adhesive properties is especially suited for applications, such as paint masking tape applications, where the adhesive is expected to adhere tightly to a masked surface, but also cleanly remove from the surface without separating from the backing. Adhesive tapes used for paint masking applications typically use a high strength backing, such as polyester.

DETAILED DESCRIPTION OF THE PREFERRED EMBODIMENTS

Pressure sensitive adhesives of the invention comprise at least one poly(1-alkene) elastomer and at least one multifunctional (meth)acrylate. In a preferred embodiment, the poly(1-alkene) elastomer is present in an amount of greater than 50 parts by weight, more preferably greater than about 60 parts by weight, of the entire composition. Preferably, the compositions comprise about 0.1 to about 40 parts by weight, more preferably about 0.1 to about 20 parts by weight, even more preferably about 1 to about 4 parts by weight, and most preferably about 0.5 to about 10 parts by weight, of the multifunctional component per 100 parts by weight of the poly(1-alkene) elastomer.

Preferably, the composition is hot-melt processable (i.e., the composition is a hot melt adhesive). As used herein, "hot melt adhesive" refers to an adhesive having a sufficient viscosity upon softening, such that the adhesive can be hot melt processed (e.g., applied to a substrate). It is not necessary for the adhesive to actually melt at the processing temperature, but rather it must soften to the point that it can be made to flow at the processing pressure. By adjusting the processing temperature, the viscosity of the adhesive can be readily tailored for application.

Hot melt adhesives advantageously reduce or eliminate the use of organic solvents in adhesives and their processing. Hot melt adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents, special handling concerns associated therewith are also reduced.

The composition of the invention can be formed by mixing the poly(1-alkene) elastomer with a multifunctional (meth)acrylate under sufficient mixing conditions to form a well-dispersed, but phase-separated, mixture. For example, the poly(1-alkene) elastomer can be melt-mixed with the multifunctional (meth)acrylate under heat and shear stress, as well as extensional mixing, to form the composition. The composition may, optionally, further comprise a photoactive agent to cure or crosslink the composition.

It is generally recognized by those skilled in the art of polymers and melt processing that it is difficult to melt mix two or more materials having greatly different melt viscosities, particularly when one material is substantially insoluble in the other, e.g., wherein one material is polar and the other is nonpolar. Surprisingly, it has been discovered that poly(1-alkene) elastomers, which are nonpolar, can be mixed sufficiently with multifunctional (meth)acrylate monomers and/or oligomers, which are polar and comparatively low in viscosity, under both ambient and melt-processing conditions, to form a phase-separated composition having unique properties.

Additionally, it is surprising that these materials can form a useful composition, e.g., a phase-separated pressure sensitive adhesive that has high cohesive strength. Preferred embodiments of the composition of the invention exhibit unexpected advantages. For example, it has been found that, when the composition of the invention is cured by exposure to electron beam, it can cure to a higher gel fraction at a significantly lower radiation dose than poly(1-alkenes) without the multifunctional (meth)acrylate. This is most profoundly apparent with poly(1-alkenes) having low molecular weights (having an inherent viscosity less than about 1.6 dL/g) and moderate molecular weights (having an inherent viscosity of less than about 2.5 dL/g), poly(1-alkenes) that are most easily melt-processed. An increased gel fraction at a lower dose may advantageously prevent degradation, e.g., chain scission of the polymer backbones, of a radiation-sensitive substrate, such as polypropylene, on which the composition of the invention may be disposed.

Furthermore, the composition of the invention preferably exhibits high adhesion to substrates such as polyacrylates and polyesters, e.g., polyethylene terephthalate and polyethylene naphthalate. This is unexpected because poly(1-alkene)-based adhesives are relatively nonpolar, while polyester and polyacrylate substrates are relatively polar.

Domains

Preferably, the pressure sensitive adhesive composition has a first domain (typically continuous) comprising a poly(1-alkene) elastomer and a second domain (typically discontinuous) comprising at least about 30% by weight of a multifunctional (meth)acrylate in order to see even further improvements in the advantages of this invention. Preferably, the second domain comprises at least about 50%, more preferably at least about 70%, and most preferably at least about 90% by weight of the multifunctional (meth)acrylate based on the total weight of the second domain.

In a preferred embodiment of the composition of the invention, the first domain comprising the poly(1-alkene) elastomer is a continuous domain, while the second domain comprising the multifunctional (meth)acrylate forms substantially discontinuous domains within the first domain. The discontinuous domains can appear in various forms including, but not limited to: droplets, spheres, striations, flattened discs, and combinations thereof The size and form of the discontinuous domains will depend upon a number of variables, such as the processing conditions, i.e., the amount of shear and extensional stress applied to the composition in the melt mixer; the mixing time and temperature; and the time elapsed between composition formation and optional curing.

The dimensions of the discontinuous domains can vary and typically range from submicron to about 100 microns. An individual domain is measured by determining its smallest dimension visible in two dimensions as viewed through an appropriate microscope, e.g., a transmission electron microscope (TEM) that can detect structures down to about 1 nanometer in size, or a scanning electron microscope (SEM) that can detect structures down to about 10 nanometers in size. The "domain size" as used herein refers to a size which is the upper size limit of at least about 80%, and preferably at least about 90%, of the domains of a representative sample of the composition as viewed through TEM or SEM. For example, in a representative sample, a domain size of about 5 microns means that at least about 80% of the domains are smaller than about 5 microns. Preferably the discontinuous domain size is less than about 10 microns, more preferably less than about 5 microns and most preferably less than about 1 micron.

When the domain size of the multifunctional (meth) acrylate phase is less than about 1 micron, the pressure sensitive adhesive composition of the invention preferably exhibits a high shear strength, e.g., a hanging shear time, at room temperature, of greater than about 500 minutes, preferably greater than about 1,000 minutes, and more preferably greater than about 5,000 minutes according to the Shear Strength Test 1–4 below, compared to the same composition without the multifunctional (meth)acrylate.

After mixing, the composition of the invention can be coated onto a substrate. It has been observed that, after coating, the discontinuous domains may coalesce into larger domains over time. Preferably, to maintain the desired phase separation, the composition can be cured by, for example, exposure to radiation. The composition can be cured immediately after coating into the desired finished form, e.g., a tape article, or it may be stored in the finished form and cured later. When cured, it is preferable that the composition is cured using electron beam radiation.

Poly(1-alkene) Elastomer

Any suitable poly(1-alkene) elastomer can be used in accordance with the present invention. The poly(1-alkene) elastomer can be a homopolymer or a copolymer. A preferred poly(1-alkene) elastomer used in the present invention has a glass transition temperature (Tg) of about −70° C. to about 0° C., more preferably about −60° C. to about −25° C.

The poly(1-alkene) elastomer used in the present invention preferably has the general formula:

H—(CH$_2$—CRH)$_n$—H  (I)

wherein:
R is independently selected from monovalent hydrocarbyl groups, with the proviso that at least about 60 mole %, and preferably at least about 80 mole %, of the R groups contain from 6 to 18 carbon atoms, more preferably 6 to 12 carbon atoms; and n is an integer in the range of from about 80 to about 50,000. Examples of suitable poly(1-alkene) elastomers include, but are not limited to, poly(1-hexene), poly(1-heptene), and poly(1-octene).

Preferably, the poly(1-alkene) elastomer comprises an essentially ethylenically saturated backbone, with optional terminal ethylenic unsaturation. Most preferably, the poly (1-alkene) elastomer is at least 99.5%, or even further at least 99.9%, saturated. These preferred elastomers contribute to melt-processing efficiency (i.e., the elastomers can be melt-processed with the multifunctional component without a significant increase in thermally induced gellation). If too much ethylenic unsaturation is present in the elastomer, an undesirably high level of crosslinking may result when melt processing the elastomer with the multifunctional component, potentially preventing melt processing of the composition.

Preferably, the poly(1-alkene) elastomer is derived from essentially all α-olefin monomers, most preferably those that are free of polyunsaturation (e.g., in the case of diene-type monomers). It is also preferred that the poly(1-alkene) elastomer is derived from essentially non-aromatic monomers, such as aliphatic monomers. Representative examples of α-olefin monomers that can be used to make the poly(1-alkene) elastomer include, but are not limited to, ethylene, propylene, 1-butene, 1-pentene, 1-hexene, 1-heptene, 1-octene, and branched α-olefins such as 2-methyl-1-butene, 2-ethyl-1-butene, 4-methyl-1-pentene, 3-methyl-1-hexene, 2-ethyl-1-hexene, 5-methyl-1-hexene, 5-ethyl-1-hexene, etc., and combinations thereof The preparation of poly(1-alkene) elastomers from α-olefin monomers is disclosed in various sources including, for example, U.S. Pat. Nos. 5,112,882; 5,644,007; and 5,202,361. The references demonstrate how poly(1-alkene)

elastomers can be polymerized to the desired molecular weights, which are measurable by their inherent viscosities (I.V.). The poly(1-alkene) elastomer preferably has a weight average molecular weight (Mw) of about 25,000 to about 10,000,000; more preferably about 100,000 to about 3,500,000; and most preferably about 250,000 to about 1,000,000.

Multifunctional (Meth)acrylate Component

The multifunctional (meth)acrylate component contains at least two functional groups (e.g., vinyl groups) that are reactive with the poly(1-alkene) elastomer upon radiation of the composition. Any suitable material can be used for the multifunctional (meth)acrylate component. The term "(meth)acrylate" includes acrylates as well as methacrylates.

Typically, the multifunctional (meth)acrylate component is non-polymeric. As such, preferably, the multifunctional (meth)acrylate component is selected from multifunctional (meth)acrylate monomers, multifunctional (meth)acrylate oligomers (including, dimers, trimers, etc.), and combinations thereof. Useful multifunctional (meth)acrylates include difunctional (meth)acrylates, trifunctional (meth)acrylates, tetrafunctional (meth)acrylates, and the like.

Examples of specific multifunctional (meth)acrylates include 1,6-hexanediol diacrylate, as well as those multifunctional (meth)acrylates, such as trimethylolpropane triacrylate; pentaerythritol tetraacrylate; 1,2-ethyleneglycol diacrylate; 1,2-dodecanediol diacrylate; urethane diacrylate; and the like, disclosed in U.S. Pat. No. 4,379,201.

The multifunctional (meth)acrylate is preferably present in an amount of about 0.1 to about 40 parts by weight, more preferably about 0.1 to about 20 parts by weight, even more preferably about 0.5 to about 10 parts by weight, and most preferably about 1 to about 4 parts by weight per 100 parts by weight of the poly(1-alkene) elastomer.

Additives

Any suitable additive may be used in the pressure sensitive adhesive compositions of the invention. For example, the composition of the invention may, optionally, further comprise a photoactive agent, such as a photoinitiator or a photocrosslinking agent, particularly if the composition is cured with actinic radiation. Photoactive agents are typically included in an amount from about 0.1 to about 6 parts by weight, preferably about 0.1 to about 2 parts by weight per 100 parts by weight of the composition.

Similarly, one or more tackifying resins, also referred to herein as "tackifying agents," may optionally be included in the composition of the present invention. The. total amount of tackifying resin in the composition typically ranges from 0 to about 150 parts by weight, preferably about 5 to about 50 parts by weight, and most preferably about 25 to about 35 parts by weight per 100 parts by weight of the poly(1-alkene) elastomer.

Furthermore, the composition may include other components suitable for the desired end use of the adhesive. For example, other useful additives include, but are not limited to: fillers, pigments, dyes, plasticizers, fibrous reinforcing agents, foaming agents, blowing agents, ceramic microspheres, glass microspheres, polymeric microspheres, antioxidants, stabilizers, processing oils, fire retardants, viscosity adjusting agents, and combinations thereof The additives are added in amounts suitable to achieve the properties desired for the end use.

Method of Making

The pressure sensitive adhesive composition of the invention can be made via a solvent-free or solvent-based process. Preferably, the composition is made via an essentially solvent-free, most preferably solvent-free, process. The composition of the invention can be prepared, for example, using standard melt-mixing equipment such as reciprocating single screw extruders, twin screw extruders, and kneaders. In some cases, it may be desirable to use two or more pieces of equipment in line to provide sufficient melt mixing of the composition.

In a preferred method, the poly(1-alkene) elastomer is melted in a hot melt mixer, or single screw extruder, and then fed to a twin screw extruder having multiple feed ports through which the multifunctional (meth)acrylate and optional additives, e.g., tackifying resins, can then be fed to the extruder. Optional additives may be introduced by themselves through a feed port, or they may be preblended with other additives and then fed through the feed port. If the component to be added is a liquid, such as some of the multifunctional (meth)acrylates, it can be pumped to a port and dripped in at a controlled rate using a peristaltic pump. The screw speed and temperatures for the extruder are set to produce sufficient shear and extensional mixing at high enough temperatures for a sufficient amount of time to mix the poly(1-alkene) elastomer with the downstream components. Immiscible materials are typically compounded together using dispersive and distributive mixing actions to preferably form a fine, uniform dispersion of the multifunctional (meth)acrylate in the poly(1-alkene) elastomer.

The extruder barrel temperatures are typically set between about 100° C. and about 180° C. with an increasing temperature profile. Temperatures may be varied depending on the particular composition and the desired amount of mixing. The composition typically exits the extruder barrel and is pumped into a flexible hose and through a die with an opening set to provide the desired adhesive thickness.

Typically, the composition of the invention is coated onto a suitable substrate using an extrusion film die. Preferably, a contact coating die is used. The coated composition can then, optionally, be cured in line, as is preferable, or it may optionally be cured at a later time. For example, the coated composition may be cooled and wound into a roll for later curing. Alternatively, compounded extrudate may be pumped into a form, such as a rope or stick, for later remelting, remixing, and coating onto a substrate and curing.

The coated composition can be cured by exposure to radiation such as electron beam, gamma, or actinic radiation. As compared to actinic radiation, electron beam and gamma radiation are advantageously used to cure the composition without requiring the use of an initiator. Commercially available electron beam curing devices, such as those available from, for example, Energy Sciences Incorporated, Wilmington, Del., are suitable for carrying out the curing step. The preferred electron beam dosage required to cure the composition of the invention typically ranges from about 1 to about 20 Megarads (Mrads), preferably from about 2 to about 10 Mrads.

Compositions of the invention that include a photoactive agent, such as a photoinitiator and/or a photocrosslinking agent can be cured using a source of actinic radiation of sufficient energy (i.e., wavelength range) to generate free radicals when incident upon the particular photoactive agent selected. The wavelength range for the photoactive agents disclosed above is preferably about 150 to about 400 nanometers, although wavelengths outside of this range can potentially be used depending upon the particular photoactive agent. The radiant energy in this preferred range of wavelengths is typically about 100 to about 1,500 milliJoules/cm$^2$, preferably about 200 to about 800 milliJoules/cm$^2$.

In the practice of the method of the invention, the composition is typically coated onto a substrate. The substrate may be a film, foam, woven web, or nonwoven web, for example. Suitable substrates include, but are not limited to, materials that are polymeric, glass, ceramic, metal, and composites thereof The substrate may be in any suitable form such as a sheet or a three-dimensional object.

Particularly useful substrates are tape backings. Suitable tape backings include oriented and unoriented polymeric films, woven and nonwoven fabrics, metal foils, polymeric foams, and the like. The backings can be made from various materials, which include, but are not limited to, polyethylene, polypropylene, cellulose, polyester, polyacrylic, and polyimide.

In a preferred embodiment of an article of the invention, the article comprises a tape backing having a cured coating of the pressure sensitive adhesive thereon. In a highly preferred embodiment, the cured pressure sensitive adhesive composition has a multifunctional (meth)acrylate domain size of about 3 microns, more preferably about 1 micron in size, and the composition is coated and cured on a polyester film substrate, such as, for example, polyethylene terephthalate or polyethylene naphthalate; a polyacrylic film; or a polyacrylic foam substrate. Such tapes preferably exhibit excellent adhesion to polyester and polyacrylic substrates, and when the multifunctional (meth)acrylate domains have a domain size of about 1 micron, the pressure sensitive adhesives even more preferably have relatively high shear strengths.

The pressure sensitive adhesive composition can also be made into an adhesive transfer tape in which a layer of the pressure sensitive adhesive composition is coated onto a release liner. Suitable release liners include, but are not limited to, polymeric films and papers that have been treated with a release agent, such as silicone.

The coated composition on the release liner can then be cured and the coated liner wound into a roll. The roll is subsequently unwound, the composition is applied to a surface, and the release liner is removed to allow adherence of the composition to an additional surface. Alternatively, the coated, but uncured, composition on the liner may be applied to a desired surface and then cured on the surface either with or without the liner depending upon the type of liner and the method of curing. Further, the uncured composition on the liner may be used to attach two substrates by applying the composition to one substrate, removing the liner, adhering a second substrate to the composition, and curing the composition between the substrates provided, that at least one of the substrates is transparent to the type of radiation used for curing.

EXAMPLES

The following non-limiting examples serve to further illustrate specific embodiments of the invention. All of the materials are reported in parts by weight (parts) and are equal to parts by weight per 100 parts by weight of poly(1-alkene).

Test Methods
180° Peel Adhesion Test

Pressure sensitive adhesive tape samples 1.25 centimeters (cm) wide and 15 cm long were tested for 1800 peel adhesion to panels of cleaned glass (Glass), stainless steel (SS), isotactic polypropylene (PP), low-density polyethylene (LDPE), or anodized aluminum (Alum). The samples were adhered to the test surfaces by rolling the tapes with a 2.1 kilogram (kg) roller using 4 passes. After aging at controlled temperature and humidity (CTH) conditions (approximately 22° C. and 40% relative humidity) for approximately 24 hours, the tapes were tested using a Model 3M90 slip/peel tester, available from Instrumentors, Inc., Hingham, Mass., in 1800 geometry at 30.5 cm per minute, unless otherwise noted. Results are determined in pounds per 0.5 inch, and reported below in Newtons per decimeter (N/dm). The failure mode was noted as "coh" when the adhesive cohesively split, leaving residue on both the tape and the panel, "adh" when the adhesive separated adhesively from the backing, "adhp" when the adhesive separated adhesively from the panel, and "mix" when more than one failure mode was present.

Shear Strength Tests 1–4

Shear strength, as determined by holding time, was measured on pressure sensitive adhesive tape samples at CTH conditions. Very high shear strengths (greater than 10,000 minutes) are desirable as they lead to resistance to flow under load as well as clean removal. Test 1 used a 12.7 millimeter (mm)×12.7 mm section of the tape that was adhered to a stainless steel sheet with a 2.1 kg roller using 4 passes. The panel was then hung −2° degrees from the vertical position to ensure a shear failure mode. A 1000 gram weight was hung from the sample. The amount of time for the weight to drop was recorded. The test was stopped after 10,000 minutes had elapsed. All shear times are an average of two test samples.

All reported failure times are the result of cohesive failure unless otherwise noted. A designation of "A" denotes a failure in which 75–100% of the failure was adhesive.

Test 2 was conducted in the same manner as Test 1 except that a 12.7 mm×25.4 mm sample was used. Test 3 was conducted in the same manner as Test 1 except that a 25.4 mm×25.4 mm sample was used. Test 4 was conducted in the same manner as Test 2 except that a 500 gram weight was used and the testing temperature was 70° C.

Inherent Viscosity [(ASTM D 2857-70 (Reapproved 1977)]

Inherent viscosity (I.V.) is directly related to polymer molecular weight. This test was used to characterize the various poly(1-octene) elastomers used herein. The I.V. of a 10 milliliter (mL) portion of a 0.1 gram per deciliter (g/dL) solution of the sample in toluene was measured using a Canon-Fenske 150 viscometer in a water bath controlled at 25° C. The I.V. is reported in dL/g. The solvent used was toluene.

Gel Content [ASTM D 3616-821]

The gel content was determined by placing a square test specimen (3.8 cm×3.8 cm) containing approximately 0.06 gram of the composition in a 120-mesh stainless steel basket measuring approximately 4.4×4.4×1.3 cm. The contents were weighed to the nearest 0.1 mg and then immersed in a capped beaker containing sufficient toluene to cover the specimen. After extraction for 24 hours, the basket (containing the specimen) was removed, drained, and placed in an oven at 93° C. The basket and specimen were dried to a constant weight. The gel content was determined from the amount of material extracted as follows:

(a) Extract %=(weight lost during extraction/ weight of original specimen)×100

(b) % Gel content=100 −Extract %

The gel content of the composition was corrected for the backing weight, but not the weight of tackifying agent.

Materials Used In The Examples

Arkon™ P-115—A hydrogenated aliphatic tackifying resin available from Arakawa Chemicals, Houston, Tex.

Regalrez™ 1126—A hydrogenated aliphatic tackifying resin available from Hercules Inc., Wilmington, Del.

Irganox™ 1010—An antioxidant tetrakis[methylene-3-(3',5'-di-tert-butyl-4'-hydroxyphenyl)-propionate]methane, available from Ciba-Geigy Corporation, Switzerland.

TMPTA—Trimethylolpropane triacrylate (Sartomer SR-351) is a tri-functional monomer available from Sartomer Company Incorporated, Exton, Pa.

HDDA—1,6-hexanedioldiacrylate (Sartomer SR-238) is a di-functional monomer available from Sartomer Company Incorporated, Exton, Pa.

PETA—Pentaerythritol tetraacrylate (Sartomer SR-295) is a tetra-functional monomer available from Sartomer Company Incorporated, Exton, Pa.

Examples 1–3

The method to prepare the poly(1-octene) is disclosed in U.S. Pat. No. 5,644,007. A cocatalyst solution of 25% solids triethylaluminum (AlEt$_3$) in heptane (Albemarle Corp.; Baton Rouge, La.) and purified 1-octene in a ratio of 66:1000, and a catalyst suspension of Lynx™ 900 catalyst (available from Catalyst Resources Inc.; Pasadena, Tex.) and hexane in a ratio of 63.6:10,000 were fed to a 20L capacity stirred tubular reactor described in U.S. Pat. No. 5,644,007. The purified 1-octene feed rate was 350.0 g/min, the cocatalyst solution feed rate was 22.13 g/min, and the catalyst suspension feed rate was 25.30 g/min. The monomer and cocatalyst solutions were merged through a t-pipe connector, preheated to approximately 70° C. and pressure fed into the reactor. The catalyst suspension, continuously stirred under nitrogen to prevent stratification and oxygen contamination, was introduced using a peristaltic pump. The temperature of the reaction mixture in each section of the reactor was maintained at approximately 70° C. The quenched reaction mixture was collected, volatile components were removed, and the I.V. of the polymer was measured to be 2.0 dL/g.

The 2.0 dL/g I.V. poly(1-octene) elastomer was fed from a Bonnot extruder (available from the Bonnot Company, Uniontown, Ohio) into the first barrel section of a twin-screw extrusion compounding device at a feed rate of 94.4 grams/minute (g/min). The Bonnot temperature was controlled to 93° C. and was fitted with a metering Zenith gear pump (available from Zenith Products Company, West Newton, Mass). The twin-screw extruder (TSE) was fully intermeshing and operated in a co-rotating mode. The TSE was a Model ZSK 30, available from Werner & Pfleiderer, Ramsey, N.J., having a 30 millimeter diameter and a 36 to 1 length to diameter ratio with 12 barrel sections. A dry powder blend of 19 parts of tackifying resin (Arkon™ P-115) and 1 part of antioxidant (Irganox™ 1010) was fed to open ports at barrels 3 and 7 as a 50/50 split (by weight) of the material using a K-Tron™ gravimetric feeder available from K-Tron International, Incorporated, Pitman, N.J. The total feed rate of the tackifier was 18.2 g/min. A tri-functional acrylate (trimethylolpropane triacrylate (TMPTA)) was dripped into an open port at barrel 5 at a feed rate of 1.14 g/min using a Masterflex™ L/S™ Variable Speed Modular Drive combined with a L/S™ 14 Standard Pump Head (model numbers LC-07553-80 and LC-07014-20, available from Cole-Parmer Instrument Company, Vernon Hills, Ill.). The peristaltic pump was fitted with L/S™ 14 Tygon™ Fuel and Lubricant tubing (available from Norton Performance Plastics of Wayne, N.J.) having a 1.6 mm inner diameter. The TSE screw speed was set at 200 revolutions per minute (rpm) and the temperature profile was 0° C., 100° C., 30° C., 135° C., 0° C., 150° C., 0° C., 165° C., 165° C., 164° C., 177° C., and 177° C. in barrels 1 through 12, respectively. A Zenith gear pump was used to discharge the molten composition out of the TSE into a flexible hose and subsequent contacting rotating rod die. The gear pump, flexible hose and coating die temperatures were each set to 166° C. The gear pump rpm and film take-away speed were adjusted to provide a 29.3 grams per square meter (grams/m$^2$) coating weight onto a 25 micrometers thick polyethylene terephthalate (PET) film.

The resulting pressure sensitive adhesive had a composition, by weight, of 100 parts of poly(1-octene) elastomer, 19 parts of tackifying resin, 1.2 parts TMPTA, and 1 part antioxidant. The gel content of the composition after extrusion was 0.3%, indicating that negligible gelling occurred in the extrusion process. The negligible gel content demonstrates that thermal processing of TMPTA with tackifying resin and poly(1-octene) does not cause significant thermal gelation or crosslinking. Thermal gelation is undesirable for melt processing since it can lead to poor extrusion quality.

The coated composition of Example 1 was then subjected to electron beam (EB) radiation from an ELECTROCURTAIN Model CB-175 (available from Energy Sciences Incorporated, Wilmington, Mass.) operating at 175 kilovolt (kV) accelerating voltage and 4 megarads (Mrads) dosage in-line after coating. The gel content of the cured composition was 35%. Examples 2 and 3 were prepared in an identical manner to Example 1, except that they were aged for two weeks at CTH conditions and then EB cured at 175 kV and 6 and 8 Mrads, respectively. Examples 1–3 were tested for adhesive properties and the results are shown in Table 1.

TABLE 1

| Ex. | EB Dose (Mrads) | Shear Strength (minutes) | | 180° Peel Adhesion (N/dm) (Failure Mode, if applicable) Substrate | | |
|---|---|---|---|---|---|---|
| | | Test 2 | Test 3 | LDPE | PP | Glass |
| 1 | 4 | 326 | 10,000+ | 41 | 97 | 78 |
| 2 | 6 | 61 | 670 | 26 | 48 | 41 |
| 3 | 8 | 111 | 945 | 42 | — (coh) | 67 |

The sample that was electron beam cured in-line after coating (Example 1) exhibited higher adhesion to both polypropylene and glass, as well as a higher shear resistance than those samples cured after aging at CTH for two weeks (Examples 2–3). These examples demonstrate the effects of composition and in-line curing soon after coating, versus off-line curing at a later time, on the pressure sensitive adhesive properties.

Example 4 and Comparative Examples C1–C3

Example 4 and Comparative Examples C1–C4 were prepared using the same mixing and coating method described for Examples 1–3 except that a poly(1-octene) elastomer having an I.V. of 2.5 dL/g was pumped into barrel 1 of the TSE using a Bonnot fitted with a Zenith gear pump operating at 77° C. Arkon™ P-115 tackifying resin was fed as a dry powder into an open port at barrel 5. TMPTA was dripped into an open port at barrel 2 using a Masterflex™ peristaltic pump. The TSE temperature profile was 0° C., 100° C., 30° C., 135° C., 45° C., 150° C., 0° C., 165° C., 170° C., 175° C., 177° C., and 177° C. in barrels 1 through 12, respectively. The flexible hose and die temperatures were maintained at 165° C. and the TSE screw speed was 200 rpm. The gear pump discharge rate and coating speed (9.2 meters per minute) were controlled to provide a coating thickness of 59 g/m$^2$ onto a polyethylene terephthalate film. The composition of Example 4 was 100 parts of 2.5 dL/g I.V. poly(1-octene), and 4. parts of TMPTA. The composition of Examples C1–C3 was 100 parts of 2.5 dL/g I.V. poly(1-octene). All of the examples were EB cured in-line after coating at 175 kV at doses indicated in Table 2.

The adhesives were tested for shear strength and peel adhesion. The results are shown in Table 2.

TABLE 2

| Ex. | EB Dose (Mrads) | Shear Strength (minutes) (Failure Mode, if applicable) | | 180° Peel Adhesion (N/dm) (Failure Mode, if applicable) Substrate | | | |
|---|---|---|---|---|---|---|---|
| | | Test 2 | Test 4 | Glass | LDPE | PP | Alum |
| C1 | 4 | 2 | 5 | — (coh) | — (coh) | — (coh) | 74 (adh) |
| C2 | 6 | 14 | 220 | 38 | 56 | 59 | 66 (adh) |
| C3 | 8 | 45 | 3,420 | 19 | 48 | 51 | 58 (adh) |

TABLE 2-continued

| Ex. | EB Dose (Mrads) | Shear Strength (minutes) (Failure Mode, if applicable) | | 180° Peel Adhesion (N/dm) (Failure Mode, if applicable) Substrate | | | |
|---|---|---|---|---|---|---|---|
| | | Test 2 | Test 4 | Glass | LDPE | PP | Alum |
| 4 | 8 | 161 (A) | 7,630 (A) | 8.2 | 12 | 13 | 82 (coh) |

The inclusion of a multifunctional (meth)acrylate improves both ambient and elevated temperature shear strengths. The data also demonstrate the excellent adhesion of a composition of the invention to a PET film as indicated by the cohesive failure mode on anodized aluminum. Additionally, the composition of the invention demonstrates higher shear strength at both room temperature (22° C.) and elevated temperature (70° C.) than compositions without the multifunctional (meth)acrylate, at the same EB dose.

Examples 5–8

Examples 5–8 were prepared using a mixing and coating method similar to that used for Examples 1–3 except that a different TSE was used (30 mm diameter, 45/1 length to diameter ratio, 10 barrel section, co-rotating Werner & Pfleiderer model number ZSK-30). Examples 5 and 6 used a poly(1-octene) elastomer having an I.V. of 1.6 dL/g, and Examples 7 and 8 used a poly(1-octene elastomer having an I.V. of 3.3 dL/g. The poly(1-octene) elastomer was pumped into barrel 1 of the TSE using a Bonnot fitted with a Zenith gear pump operating at 104° C. Regalrez™ 1126 tackifying resin was melted at 163° C. and pumped into barrel 3 using a heated Zenith gear pump. TMPTA was dripped into open port at barrel 5 using a Masterflex™ peristaltic pump. The screw speed was set at 200 rpm. The TSE was ramped from 93° C. in barrels 1 and 2 to 163° C. in barrels 7 and 8 and maintained at 149° C. from barrels 9 and 10 through the discharging Zenith gear pump, flexible hose and die. The melt temperature at the influx of TMPTA was kept below 149° C. to minimize off-gassing of the TMPTA. The coating weight was adjusted by controlling both the line speed and gear pump discharge rate. Samples were coated at a coating weight of 147 grams/m² onto 30.5 micrometers thick PET film. The coated film was in-line exposed to electron beam radiation at 175 kV and 4 Mrads. The compositions of the adhesive are shown in Table 3. The adhesive properties were measured after aging at CTH for 24 hours and are also displayed in Table 3.

TABLE 3

| Ex. | Poly(1-alkene) (parts) | Tackifying Resin (parts) | TMPTA (parts) | 180° Peel Adhesion (N/dm) (Failure Mode, if applicable) Substrate | | | Shear Strength (minutes) | |
|---|---|---|---|---|---|---|---|---|
| | | | | Glass | PP | LDPE | Test 2 | Test 3 |
| 5 | 100 | 25 | 2 | 166 (coh) | 186 | 171 (coh) | 27 | 282 |
| 6 | 100 | 55 | 2 | 203 (coh) | 214 (coh) | 156 | 1,162 | 3,359 |
| 7 | 100 | 25 | 2 | 117 | 112 | 65 | 2,611 | 7,435 |
| 8 | 100 | 55 | 2 | 158 | 173 | 121 | 10,000+ | 10,000+ |

The adhesive properties shown in Table 3 illustrate how compositions of the invention can be modified by the selection of the poly(1-alkene) elastomer and by varying amounts of tackifying resins to give cohesive failure or adhesive failure, or to increase their shear strength. Where no failure mode was noted, the adhesive pulled away cleanly from the panel.

Examples 9–15

Examples 9–15 were prepared using the apparatus described for Examples 1–3. A poly(1-octene) elastomer having an I.V. of 2.5 dL/g was pumped into barrel 1 of the TSE using a Bonnot fitted with a gear pump that was set at 77° C. The TMPTA or HDDA were dripped into an open port at barrel 3 with a Masterflex™ peristaltic pump. Regalrez™ 1126 tackifying resin was melted at 177° C. and dripped into an open port at barrel 7. The TSE temperatures were set at 0° C., 150° C., 150° C., 130° C., 130° C., 140° C., 135° C., 145° C., 130° C., 130° C., 140° C. and 150° C. for barrels 1 through 12, respectively. The flexible hose and die temperatures were set at 165° C. The TSE screw speed was varied from 100 to 400 rpm as denoted in Table 4. The gear pump rpm and coating speed were adjusted to provide either a 29 grams/m² or 58 grams/m² coating weight (Ct. Wt.) onto a 25 micrometer thick PET film. The composition was subsequently EB cured in-line after coating at 175 kV and 4 Mrads. The adhesive compositions are shown in Table 4. The test results are shown in Table 5.

TABLE 4

| Ex. | Poly (1-octene) (parts) | Regalrez ™ 1126 (parts) | TMPTA (parts) | HDDA (parts) | Ct. Wt. (g/m$^2$) | TSE Screw Speed (rpm) |
|---|---|---|---|---|---|---|
| 9  | 100 | 20 | 4  | 0 | 29 | 400 |
| 10 | 100 | 20 | 6  | 0 | 29 | 400 |
| 11 | 100 | 20 | 10 | 0 | 29 | 400 |
| 12 | 100 | 20 | 0  | 4 | 29 | 400 |
| 13 | 100 | 55 | 2  | 0 | 58 | 100 |
| 14 | 100 | 55 | 2  | 0 | 58 | 200 |
| 15 | 100 | 55 | 2  | 0 | 58 | 400 |

TABLE 5

| | 180° Peel Adhesion (N/dm) Substrate | | | Shear Strength (minutes) (Failure Mode, if applicable) | | | |
|---|---|---|---|---|---|---|---|
| Ex. | Glass | PP | LDPE | Test 1 | Test 2 | Test 3 | Test 4 |
| 9  | 52  | 43 | 17 | 38 (A)  | 10,000+ | 10,000+ | 2,716+ |
| 10 | 35  | 39 | 30 | 37 (A)  | 1,554   | 10,000+ | 2,715+ |
| 11 | 22  | 26 | 39 | 7 (A)   | 126 (A) | 5,249 (A) | 134 |
| 12 | 19  | 26 | 19 | 22 (A)  | 10,000+ | 10,000+ | 2,697+ |
| 13 | 108 | 71 | 67 | 122     | 6,078   | 10,000+ | 280 |
| 14 | 102 | 60 | 65 | 287     | 10,000+ | 10,000+ | 1,535 |
| 15 | 102 | 60 | 63 | 728     | 10,000+ | 10,000+ | 600 |

The data in Table 5 show how the addition of varying levels of TMPTA and varying the screw speed can change the adhesion and shear properties of the adhesive.

Examples 16–19

Examples 16–19 were prepared by compounding a powdered photocrosslinking agent (2,4-bis-(tricholoromethyl)-6-(3',4'-dimethoxyphenyl)-sym-triazine) with a poly(1-octene) elastomer having an I.V. of 1.6 dL/g, and a tackifying (Regalrez™ 1126) resin in a Brabender sigma blade mixer at 170° C. The specific compositions are shown in Table 6. The compounded mixture was fed into an 18 mm diameter, co-rotating and fully intermeshing Leistritz TSE (Model MICRO 18, available from Leistritz AG, Germany) using a Bonnot fitted with a Zenith gear pump. All of the extruder zones were set at 177° C. A tetra-functional acrylate (PETA) was dripped into an open port of the TSE using a Masterflex™ peristaltic pump. The TSE screw speed was set at 100 rpm. The composition was coated at 50 g/m$^2$ onto 51 micron thick PET film. The coating was subsequently irradiated in-line after the coating step with an ultraviolet curing lamp (Model No. 3461, Fusion Systems, Inc., Rockville, Md.) fitted with an H-bulb at a distance from the web sufficient to provide either 200 or 400 millijoules per square centimeter (mJ/cm$^2$) UVA dosage. Table 6 shows the compositions, UVA dosage, and the peel adhesion test results.

TABLE 6

| Ex. | Poly (1-octene) (parts) | Tackifying Resin (parts) | Triazine (parts) | PETA (parts) | UVA dose (mJ/cm$^2$) | 180° Peel Adhesion (N/dm) to Aluminum (Failure Mode) |
|---|---|---|---|---|---|---|
| 16 | 100 | 28 | 0.15 | 0.22 | 400 | 99 (coh) |
| 17 | 100 | 28 | 0.15 | 0.22 | 200 | 93 (coh) |
| 18 | 100 | 28 | 0.15 | 0.13 | 200 | 95 (coh) |
| 19 | 100 | 28 | 0.10 | 0.13 | 400 | 99 (coh) |

The data in Table 6 illustrate how the use of a tetra-functional acrylate (PETA) with a photocrosslinking agent provides excellent adhesion to both the panel and the backing.

Example 20

A 1,000 micron thick foamed acrylic sheet was prepared according to Example 1 using the Hot Melt Composition 1 of U.S. Pat. No. 6,103,152 (incorporated herein in its entirety by reference), except that 1.75 wt. % F100D expandable microspheres (Micropearl™ F100D available from Pierce Stevens, Buffalo, N.Y.) were used and the foamed sheet was not EB cured. Example 20 was prepared by coating the pressure sensitive adhesive composition of Example 15 at a thickness of 50 microns onto the foam sheet. The coated composition was EB cured at 175 kV and 6 Mrads in-line directly after coating.

The adhesion of the pressure sensitive adhesive layer to the foam sheet was tested by applying a strip of 3M™ #371 adhesive tape (available from Minnesota Mining and Manufacturing Company; St. Paul, Minn.) directly to the pressure sensitive adhesive layer. After a five minute dwell time, the tape was removed with no transfer of the pressure sensitive adhesive to the 3M™ #371 adhesive tape. This demonstrated the excellent adhesion of the poly(1-octene) pressure sensitive adhesive of the invention to a foamed acrylic substrate.

Examples 21 and C4

Example 21 was prepared using the method of Examples 16–19, except the extruder screw speed was 400 rpm. The composition was 100 parts of poly(1-octene) having an I.V. of 1.9 dL/g, 20 parts of tackifying resin (Regalrez™ 1126), and 4 parts of HDDA. Example C5 was prepared in the same manner with the same composition except without HDDA.

The adhesives were coated to a coating weight of 29 grams per square meter. Both examples were cured with electron beam at 175 keV and 4 Mrads and tested. Results are shown in Table 7.

TABLE 7

| Ex. | % Gel | 180° Peel Adhesion (N/dm) Substrate | | | Shear Strength (minutes) | |
|-----|-------|-------|-----|------|---------|--------|
|     |       | Glass | PP  | LDPB | Test 1  | Test 4 |
| 21  | 57    | 10    | 13  | 10   | 10,000+ | 2,700+ |
| C5  | 4     | 41    | 43  | 48   | 4       | 0.1    |

Reasonable variations and modifications are possible from the foregoing disclosure without departing from either the spirit or scope of the present invention as defined in the claims.

What is claimed is:

1. A pressure sensitive adhesive composition comprising:
    a first domain comprising a non-polar poly(1-alkene) elastomer comprising an essentially saturated hydrocarbon backbone; and
    a second domain comprising a multifunctional component selected from multifunctional (meth)acrylate monomers, multifunctional (meth)acrylate oligomers, and combinations thereof;
    wherein the second domain comprises at least about 50 weight percent of the multifunctional component based on the total weight of the second domain.

2. The composition of claim 1 wherein the composition is cured.

3. The composition of claim 1 wherein the second domain comprises at least about 70 weight percent of the multifunctional component based on the total weight of the second domain.

4. The composition of claim 1 wherein the second domain comprises at least about 90 weight percent of the multifunctional component based on the total weight of the second domain.

5. The composition of claim 1 wherein the first domain is continuous and the second domain is discontinuous.

6. The composition of claim 1 wherein the composition is a hot melt adhesive.

7. The composition of claim 1 wherein the poly(1-alkene) elastomer is derived essentially from α-olefin monomers essentially free of polyunsaturation.

8. The composition of claim 1 wherein about 0.1 to about 40 parts by weight of the multifunctional component is present per 100 parts by weight of the poly(1-alkene) elastomer.

9. The composition of claim 1 wherein about 0.1 to about 20 parts by weight of the multifunctional component is present per 100 parts by weight of the poly(1-alkene) elastomer.

10. The composition of claim 1 wherein about 0.5 to about 10 parts by weight of the multifunctional component is present per 100 parts by weight of the poly(1-alkene) elastomer.

11. The composition of claim 1 wherein about 1 to about 4 parts by weight of the multifunctional component is present per 100 parts by weight of the poly(1-alkene) elastomer.

12. The composition of claim 1 wherein the poly(1-alkene) elastomer is selected from poly(1-hexene), poly(1-heptene), poly(1-octene), and combinations thereof.

13. The composition of claim 1 wherein the multifunctional component is selected from trimethylpropane triacrylate; 1,6-hexanediol diacrylate; and pentaerythritol tetraacrylate.

14. The composition of claim 1 further comprising a photoactive agent.

15. The composition of claim 1 further comprising a tackifying agent.

16. A pressure sensitive adhesive composition comprising:
    greater than 50 percent by weight of a non-polar poly(1-alkene) elastomer comprising an essentially saturated hydrocarbon backbone; and
    a multifunctional component selected from multifunctional (meth)acrylate monomers, multifunctional (meth)acrylate oligomers, and combinations thereof.

17. An article comprising:
    a substrate; and
    the composition of claim 16 coated on at least a portion of the substrate.

18. An article comprising:
    a substrate; and
    the composition of claim 1 coated on at least a portion of the substrate.

19. The article of claim 18 wherein the substrate comprises polyester.

20. The article of claim 18 wherein the substrate is selected from films, foams, woven webs, and nonwoven webs.

21. An article comprising:
    a substrate; and
    the composition of claim 2 coated on at least a portion of the substrate.

22. The article of claim 21 wherein the substrate comprises polyester.

23. The article of claim 21 wherein the substrate is selected from films, foams, woven webs, and nonwoven webs.

24. A method comprising the steps of:
    forming a pressure sensitive adhesive composition comprising:
    a first domain comprising a non-polar poly(1-alkene) elastomer comprising an essentially saturated hydrocarbon backbone;
    a second domain comprising a multifunctional component selected from multifunctional (meth)acrylate monomers, multifunctional (meth)acrylate oligomers, and combinations thereof, wherein the second domain comprises at least about 50 weight percent of the multifunctional component based on the total weight of the second domain; and
    applying the pressure sensitive adhesive composition to at least a portion of a substrate.

25. The method of claim 24 further comprising the step of curing the pressure sensitive adhesive composition.

26. A method comprising the steps of:
    forming a pressure sensitive adhesive composition comprising:
    greater than 50 percent by weight of at least one non-polar poly(1-alkene) elastomer comprising an essentially saturated hydrocarbon backbone;
    at least one a multifunctional component selected from multifunctional (meth)acrylate monomers, multifunctional (meth)acrylate oligomers, and combinations thereof; and
    applying the pressure sensitive adhesive composition to at least a portion of a substrate.

* * * * *

UNITED STATES PATENT AND TRADEMARK OFFICE
CERTIFICATE OF CORRECTION

PATENT NO. : 6,544,643 B1  Page 1 of 1
DATED : April 8, 2003
INVENTOR(S) : Hyde, Patrick D.

It is certified that error appears in the above-identified patent and that said Letters Patent is hereby corrected as shown below:

Column 3,
Line 39, after "thereof" insert -- . --

Column 4,
Line 63, after "thereof" insert -- . --

Column 5,
Line 59, after "thereof" insert -- . --

Column 7,
Line 4, after "thereof" insert -- . --
Line 60, "1800" should be -- 180º --

Column 8,
Line 3, "1800" should be -- 180º --

Signed and Sealed this

Twenty-fifth Day of November, 2003

JAMES E. ROGAN
*Director of the United States Patent and Trademark Office*